United States Patent

Cunningham et al.

Patent Number: 5,401,009
Date of Patent: Mar. 28, 1995

[54] COMPOUND DIAPHRAGM BELLOWS

[75] Inventors: David C. Cunningham, Carefree; Carl Riddle, Phoenix, both of Ariz.

[73] Assignee: Honeywell Inc., Del.

[21] Appl. No.: 13,689

[22] Filed: Feb. 4, 1993

[51] Int. Cl.⁶ .................................................. F16F 7/00
[52] U.S. Cl. .................... 267/141.1; 267/30; 188/298
[58] Field of Search ................ 188/298, 322.17, 322.5, 188/312, 316; 267/150, 140.11, 140.13, 141.1, 122, 217, 141.2, 153, 30

[56] References Cited

U.S. PATENT DOCUMENTS

| | | | |
|---|---|---|---|
| 2,973,015 | 2/1961 | Thompson | 267/122 |
| 4,760,996 | 8/1988 | Davis | 267/122 |
| 4,765,600 | 8/1988 | Hartel | 267/122 |
| 4,997,171 | 3/1991 | Toms | 267/141.1 X |
| 5,018,359 | 5/1991 | Horikawa et al. | 248/636 X |
| 5,104,101 | 4/1992 | Anderson et al. | 267/141.1 X |
| 5,110,097 | 5/1992 | Simon | 267/141.1 X |

OTHER PUBLICATIONS

Davis, U.S. Patent Application 07/991,025 entitled "Rigid Volume Viscous Damper", Dec. 15, 1992.

Primary Examiner—Robert J. Oberleitner
Assistant Examiner—Lee W. Young
Attorney, Agent, or Firm—Thomas A. Rendos

[57] ABSTRACT

A compound diaphragm bellows is provided that substantially increases the stroke of conventional viscous fluid dampers without significantly compromising radial stiffness. A method of restraining movement in a first plane while enhancing elastic movement in a plan perpendicular to the first plane is also provided. The disclosed compound diaphragm bellows are constructed by connecting alternating edges of flexible member pairs to rigid sleeves. Stiffening members may be added to enhance the compound diaphragm bellows' radial stiffness.

18 Claims, 4 Drawing Sheets

COMPOUND DIAPHRAGM BELLOWS

BACKGROUND OF THE INVENTION

1. Field of the Invention

The present invention relates generally to vibration damping and isolation and more particularly to vibration damping and isolation for devices having extremely low vibration tolerances. Specifically, this invention relates to a compound diaphragm bellows which hermetically seals both ends of a rigid volume damper.

2. Discussion of the Related Art

Vibrations are often harmful to mechanical devices. Vibration control is important in practically any high precision structure containing or contacting moving parts. Take telescopes for example. Telescopes have stringent aiming requirements. Even the small vibrations caused by imperfections in the ball bearings or the race supporting the aiming system are highly undesirable.

Several vibration control systems have been developed. Two common methods of vibration control are viscoelastic damping and viscous fluid damping. Viscoelastic materials can provide damping for many applications; however, they exhibit cyclic wear and are excessively sensitive to temperature and other environmental conditions.

Viscous fluid dampers avoid some problems associated with viscoelastic dampers. Viscous fluid dampers rely on fluid shear forces to absorb vibrational energy. One such viscous damper is described in U.S. Pat. No. 4,760,966, which was issued to Davis on Aug. 2, 1988 and is assigned to Honeywell Inc.

The viscous damper described in U.S. Pat. No. 4,760,996 is essentially cylindrical. A shaft is disposed along the axis of the damper, and at either end of the shaft is attached a cylindrical hub with an outer radius greater than that of the shaft. A piston, having an aperture or bore slightly larger than the shaft, is coaxial with the shaft with the shaft passing through the piston bore. A flange extends radially from the piston and is adapted for connection to an external load. One of the hubs is also adaptable for connection to an external load. Two sets of cylindrical bellows connect the hubs to the flange extending radially from the piston. The bellows, hubs, and the piston form a first chamber and a second chamber.

When an axial force is applied to either the piston flange or the hubs, the piston moves relative to the shaft. This relative movement forces fluid from one chamber through the passageway between the piston and the shaft and into the other chamber. As the fluid passes through the narrow passageway between the shaft and the piston bore, viscous fluid shear occurs. To generate effective viscous fluid shear forces, the passageway between the piston bore and the shaft must be relatively narrow. Viscous fluid shear dissipates the energy conveyed into the system and thus dampens the vibration.

Not all forces applied to the damper are axial. Radial forces may enter the damper through the piston flange or the hubs. Unchecked, these radial forces might cause the shaft to contact the piston bore. Such contact is undesirable, creating friction and wear and perhaps engagement between the piston and shaft requiring more force to overcome than the damper is designed to handle. The bellows connecting the flange and the hubs prevent some radial movement of the piston relative to the shaft.

Radially stiff bellows are desirable to maintain the axial alignment of the damper members. While radial stiffness is desirable, axial stiffness is not. Relatively free axial piston movement is necessary for effective viscous fluid damping.

Although the damper disclosed in U.S. Pat. No. 4,760,996 provides many advantages, it did not solve all of the problems now appreciated. For example, a bellows resistant to distortions and deflections caused by relatively small radial forces is desirable. Further, it is recognized that the bellows disclosed in U.S. Pat. No. 4,760,996 tend to expand when fluid pressure within the damper exceeds ambient pressure. Such expansion robs the damper of efficiency.

On Dec. 15, 1992, a patent application entitled "Rigid Volume Viscous Damper," U.S. Ser. No. 07/991,025, was filed in the name of L. Porter Davis. The rigid volume viscous damper disclosed by Davis effectively eliminates the fluid pressure acting upon the bellows by encasing the piston between rigid bushings thereby providing advantages over the disclosure of U.S. Pat. No. 4,760,996. In one embodiment, Davis discloses a rigid chamber formed by two rigid bushings and a piston within a housing. A rod extends axially from both sides of the piston. Each rod passes through an aperture in the bushings and is thereafter connected to a diaphragm hub. A thin diaphragm connects each hub to a damper housing which encases the bushings. Each diaphragm hermetically seals the damper housing.

The bushings are connected to the damper housing which is in turn connected to a load. At least one diaphragm hub is connected to ground. An axial force acting upon the damper will cause the piston and rod assembly to move relative to the damper housing. The diaphragm connected to the damper housing is also connected to the rods extending axially from the piston. Therefore, the inner portion of the diaphragms moves with the piston relative to the damper housing while the outer portion of the diaphragms moves with the damper housing relative to the piston and rod assembly.

The relative axial movement of the piston forces fluid to move from a first compartment defined by the bushings and first piston face to the second compartment defined by the bushings and a second piston face. The fluid movement occurs through a passageway between the interior diameter of the bushings and the exterior diameter of the piston. As the fluid passes through this passageway, viscous fluid shear occurs which dissipates the energy brought into the damper.

U.S. patent application Ser. No. 07/991,025 discloses using two annular diaphragms, one at each end of the viscous fluid damper, which hermetically seal the damper housing. The diaphragms, made from thin sheets of titanium, are very effective in preventing radial movement of the piston relative to the rigid chamber. The titanium diaphragm is also compliant in the axial direction. However, the diaphragm's axial compliance decreases rapidly after a relatively short stroke. Axial compliance can be increased by increasing the radius of the diaphragm; however, in many applications available space is limited.

In an alternate embodiment, U.S. patent application Ser. No. 07/991,025 discloses a bellows replacing the diaphragm just described. The bellows connect either end of the rod and piston assembly to the viscous damper housing. These bellows permit greater axial deflection than the annular diaphragms described previously. Unfortunately, the bellows also permit greater radial deflection than the annular diaphragms.

The disclosures of U.S. Pat. No. 4,760,996 and those made in U.S. patent application Ser. No. 07/991,025 illustrate some of the problems confronting those in the damping art. High axial deflection in the bellows or diaphragms connecting the piston assembly to the housing permits a long stroke and thereby allows desirable damping of greater magnitude vibrations. It is also desirable for the diaphragms or bellows member to maintain radial stiffness. The previously known diaphragms or bellows with substantial radial stiffness have undesirable short strokes. Those diaphragms or bellows with a greater stroke have undesirable radial flexibility.

SUMMARY OF THE INVENTION

The present invention provides further and additional advantages over the devices in the prior art through a structure with enhanced elastic deflection characteristics. In one embodiment, the structure is composed of a plurality of spaced flexible members attached to a plurality of interposed rigid members with a first force input means connected to the first flexible member.

In another embodiment of the present invention, an axially movable member is attached to the inner periphery of a first flexible member. The first flexible member is generally annular in shape and is perpendicular to the axis of movement of the axially movable member. A cylindrical rigid member is attached to the outer periphery of the first flexible member. A second annular flexible member is attached to the first rigid member at its outer periphery. The second flexible member is parallel to the first flexible member and has an interior periphery with a radius sufficient to allow the movable member to move therethrough. A second cylindrical rigid member is attached at the interior periphery of the second flexible member. A third flexible member is attached to the second rigid member at its interior periphery. The third flexible member is parallel to the second flexible member and has an interior periphery of radius similar to the second flexible member interior periphery.

In yet another embodiment, a third cylindrical rigid member is attached to the outer periphery of the third flexible member and is adaptable for transferring force into the assembly. A fourth flexible member, substantially identical to the third flexible member, is connected to the third rigid member at its outer periphery. A fourth rigid member, substantially identical to the second rigid member, is connected to the interior periphery of the fourth flexible member. A fifth flexible member, substantially identical to the second flexible member, is connected to the fourth rigid member at its interior periphery. A fifth rigid member, substantially identical to the first rigid member, is connected to the outer periphery of the fifth flexible member. A sixth flexible member, substantially identical to the first flexible member, is connected at its outer periphery to the fifth rigid member and at its inner periphery to the axially movable member.

In another embodiment, a first stiffening member is connected to the first rigid member and the fifth rigid member. The first stiffening member can be adapted to allow transfer of force to the third rigid member from an external source. A second stiffening member can also be connected to the second rigid member and to the fourth rigid member.

In another embodiment of the invention, an improved method of restraining movement in one plane while promoting elastic movement perpendicular to the plane is provided by interconnecting a plurality of spaced coaxial flexible members with a plurality of coaxial rigid members, the odd number of the rigid members being connected to the outermost peripheries of adjacent flexible members and the even number of said rigid members being connected to the innermost peripheries of the next adjacent flexible members.

Accordingly, it will be appreciated that the present invention provides at least the following advantages:
1. enhanced deflection in a first plane;
2. controlled deflection in the plane perpendicular to the first plane; and
3. minimized space consumption.

BRIEF DESCRIPTION OF THE DRAWING

For detailed understanding of the present invention, reference should be made to the following detailed description, taken in conjunction with the accompanying drawings, in which like elements have been given like numerals, and wherein.

DETAILED DESCRIPTION OF THE PREFERRED EMBODIMENT

Figure 1:
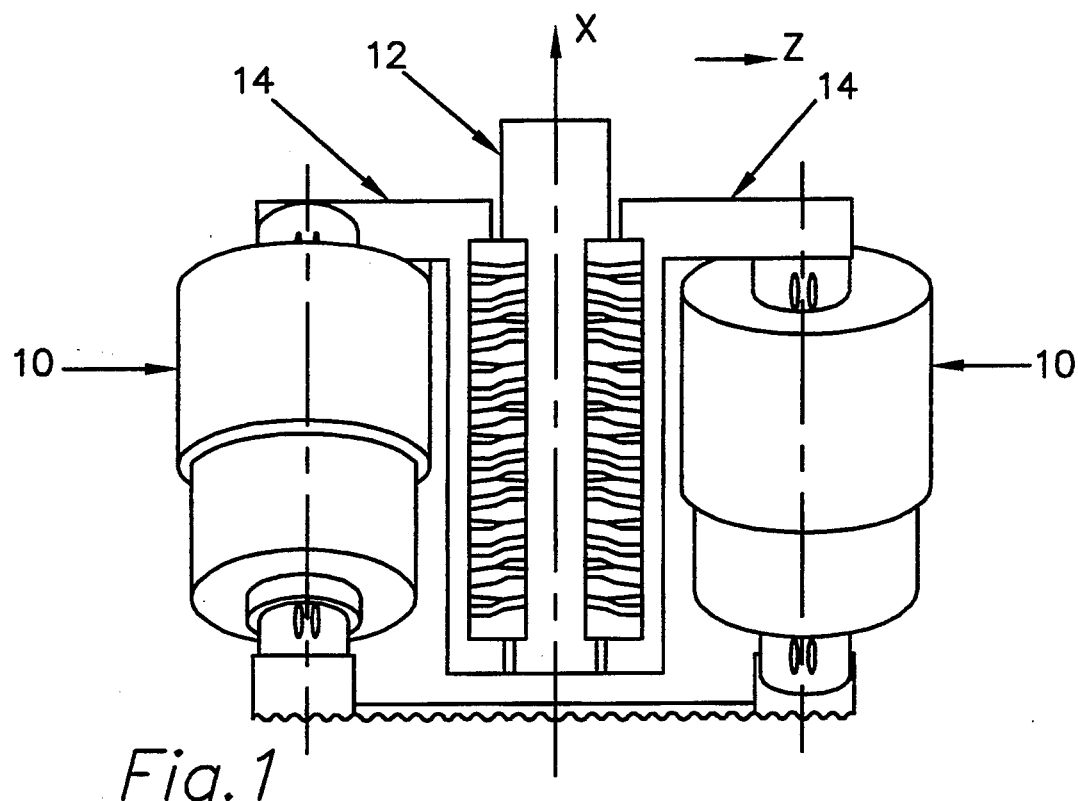
FIGS. 1 and 2 are elevational views of a pair of conventional viscous fluid dampers.

While this invention is susceptible of embodiment in many different forms, there is shown in the drawings and described in detail herein a preferred embodiment. The present disclosure is intended to be an exemplification of the principles of the invention, generally, and a preferred embodiment, specifically, and should not be construed to limit the invention to the embodiments illustrated.

Figure 2:
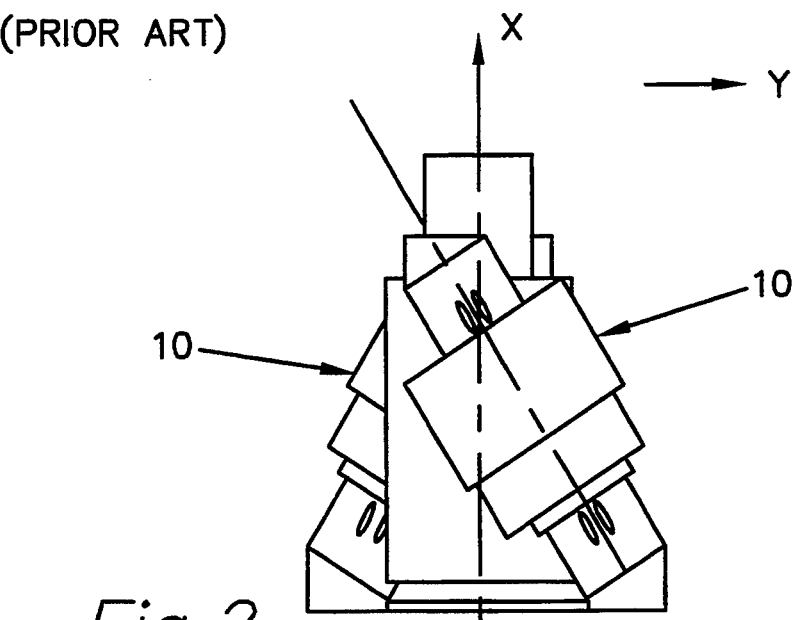

FIGS. 1 and 2 illustrate two prior art viscous fluid dampers 10 that could benefit from the present invention. The viscous fluid dampers 10 are mounted on either side of a load limiter 12 by load attachment members 14. The load attachment members 14 are pivotally connected to one end of the viscous fluid dampers 10. The other end of the viscous fluid dampers 10 are connected to ground. Motion in either the X or Y direction forces the viscous fluid dampers 10 in either compression or extension along their axis.

Figure 3:
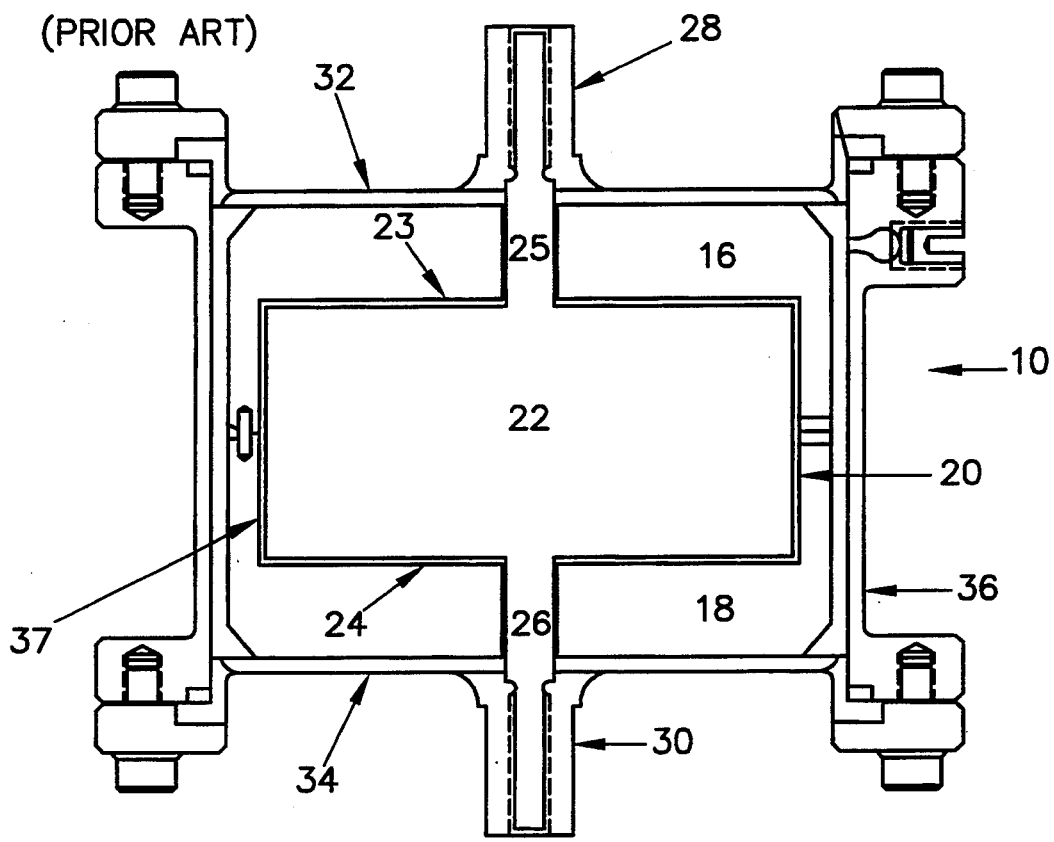
FIG. 3 is an elevational view, in cross section, of a conventional viscous fluid damper.

FIG. 3 is a cross-sectional view of an existing viscous fluid damper 10, specifically the damper disclosed in U.S. patent application Ser. No. 07/991,025, which is incorporated by reference. The viscous fluid damper 10 depicted might be found in the damping system depicted in FIGS. 1 and 2. In the embodiment depicted in FIG. 3, a first rigid bushing 16 is connected to a second rigid bushing 18, which together form an aperture 20. A piston 22 divides the aperture 20 into a first chamber 23 and a second chamber 24. Connected to the piston 22 is a first rod 25 and a second rod 26. The first rod 25 passes through the first rigid bushing 16 and is connected to a first hub 28. The second rod 26 passes through the second rigid bushing 18 and is connected to a second hub 30. The first hub 28 is connected to a first diaphragm 32, the second hub 30 is connected to a second diaphragm 34. The first diaphragm 32 and the second diaphragm 34 are connected to the damper housing 36.

The piston 22 is connected to ground through either the first hub 28 or the second hub 30. The damper housing 36 is connected to the load attachment member 14 of FIG. 1. Load application causes the damper housing 36 to move relative to the piston 22. The first chamber 23 and the second chamber 24 are filled with a viscous fluid. The outer edge of the piston 22 is relatively close to the interior diameter of the first rigid bushing 16 and second rigid bushing 18. As the piston 22 moves relative to the damper housing 36, fluid is forced from the contracting first chamber 23 along a narrow gap 37 between the piston 22 and the first rigid bushing 16 and the second rigid bushing 18 into the expanding second chamber 24. As the fluid passes between the piston 22 and the first rigid bushing 16 and the second rigid bushing 18 along the narrow gap 37, viscous fluid sheer forces are created which dissipate the energy introduced into the damper.

In this prior art device, the first diaphragm 32 and second diaphragm 34 are thin sheets of titanium hermetically sealing the damper 10. The first diaphragm 32 and second diaphragm 34 have high radial stiffness which helps maintain the coaxial relationship of the piston 22, first rod 25, second rod 26, first rigid bushing 16, second rigid bushing 18, first diaphragm 32, second diaphragm 34 and damper housing 36. Maintaining the coaxial relationship of these members prevents undesirable engagement of the piston and rod assembly with the rigid bushings. The first diaphragm 32 and the second diaphragm 34 permit axial displacement approximately equal to their thickness.

Figure 4:
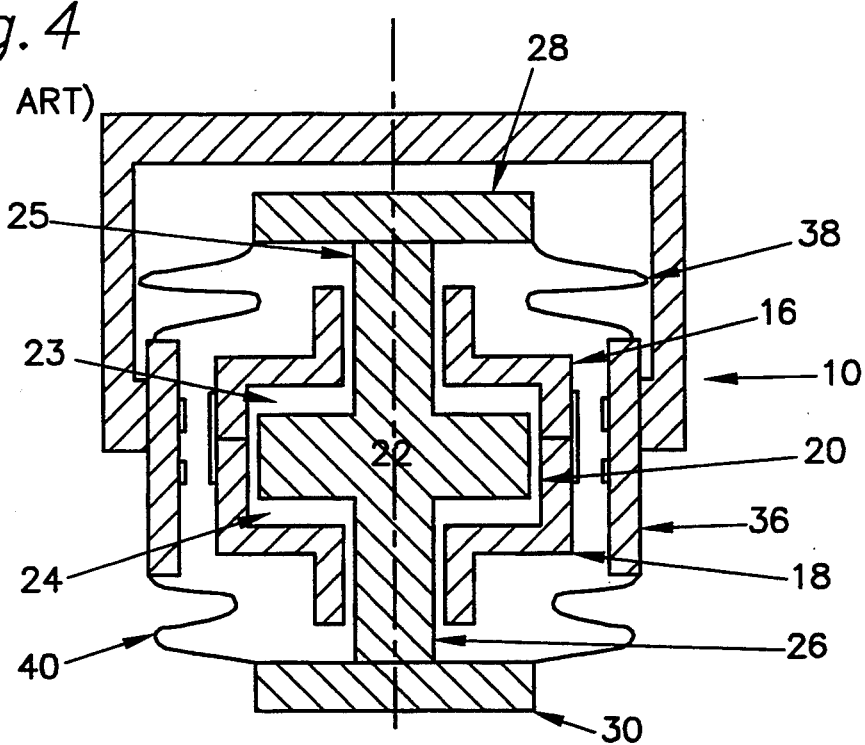
FIG. 4 is an elevational view, in cross section, of an alternate embodiment of a conventional viscous fluid damper.

FIG. 4 is a cross-sectional view of another viscous fluid damper 10 disclosed in U.S. patent application Ser. No. 07/991,025. In this example, a first bellows 38 and a second bellows 40 connect the first hub 28 and the second hub 30 to the damper housing 36. The first bellows 38 and second bellows 40 are more compliant axially than the first diaphragm 32 and the second diaphragm 34, permitting greater relative movement between the piston 22 and the damper housing 36. However, the bellows also permit greater relative radial movement between the piston 22 and the damper housing 36 which increases the possibility of engagement of the piston 22 or first rod 25 or second rod 26 with the first rigid bushing 16 or the second rigid bushing 18. The first bellows 38 and the second bellows 40 hermetically seal the viscous fluid damper 10.

Figure 5:
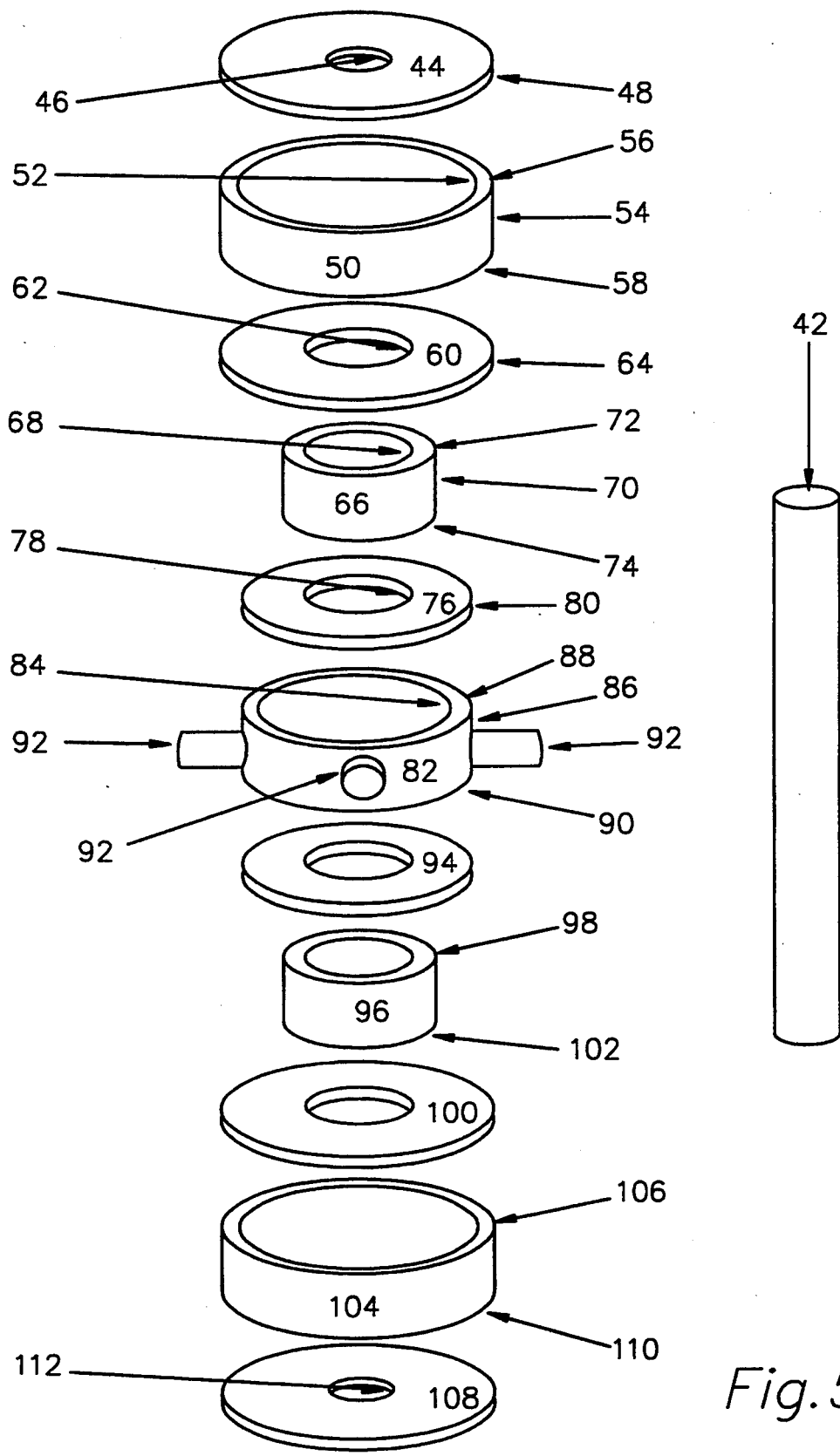
FIG. 5 is an exploded view of a compound diaphragm bellows according to the present invention.
Figure 6:
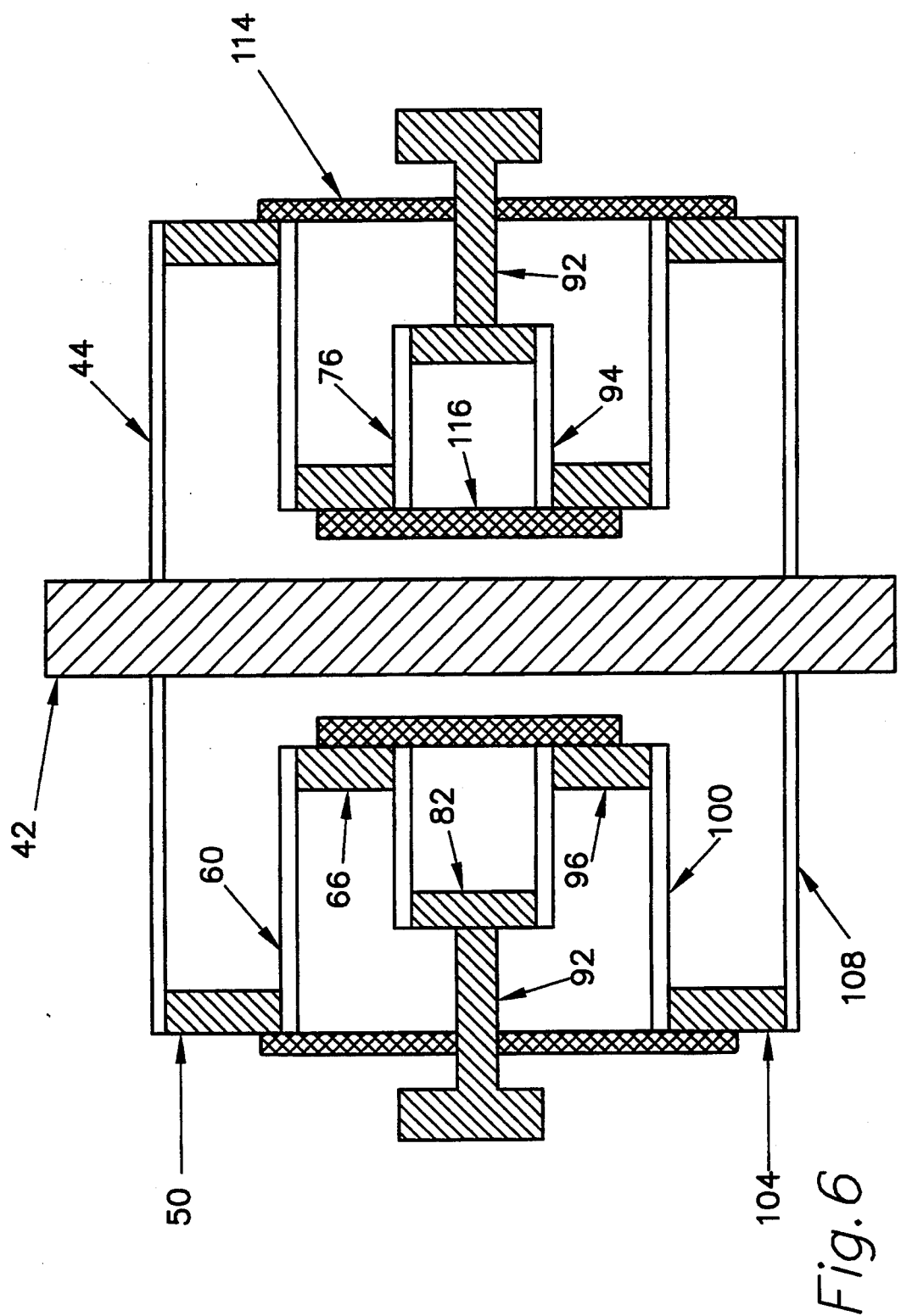
FIG. 6 is an elevational view, in cross section, of a compound diaphragm bellows according to the present invention.

Turning now to the present invention, FIG. 5 is an exploded view, and FIG. 6 is a cross-sectional view of similar embodiments. Each of the first diaphragm 32 and second diaphragm 34 of FIG. 3 can be replaced by the invention as embodied in FIGS. 5 and 6. In other words, a first and a second embodiment of the present invention can be used to replace the first diaphragm 32 and the second diaphragm 34.

In one embodiment of the invention, a shaft 42 is connected to the piston 22 either directly or through the upper rod 25 or the lower rod 26. The shaft 42 is also connected to a first flexible member 44. The first flexible member 44 is annular and includes a first flexible member interior wall 46. The outer surface of the first flexible member 44 is defined by a first flexible member exterior wall 48. The first flexible member 44 is connected to the shaft 42 at the first flexible member interior wall 46 and a first rigid sleeve 50 at the first flexible member exterior wall 48.

The first rigid sleeve 50 is substantially cylindrical with an aperture therein defining a first rigid sleeve interior wall 52. "Substantially," as used herein, is intended to capture insubstantial variations in dimension or placement. The first rigid sleeve interior wall 52 has a radius greater than the first flexible member interior wall 46. The exterior of the first rigid sleeve 50 defines a first rigid sleeve exterior wall 54. The first rigid sleeve exterior wall 54 has a radius substantially equal to the radius of the first flexible member exterior wall 48. The first rigid sleeve exterior wall 54 is substantially coaxial with the first flexible member exterior wall 48. The first rigid sleeve 50 further includes a first end 56 and a second end 58, the first end 56 being connected to the first flexible member 44.

A second flexible member 60 is connected to the second end 58 of the first rigid sleeve 50. The second flexible member 60 is substantially annular and has an aperture therein defining a second flexible member interior wall 62. The second flexible member interior wall 62 has a radius greater than the first flexible member interior wall 46 but not as great as the radius of the first rigid sleeve interior wall 52. The exterior edge of the second flexible member 60 defines a second flexible member exterior wall 64, which has a radius substantially equal to the radius of the first flexible member exterior wall 48. Further, the second flexible member interior wall 62 and the second flexible member exterior wall 64 are substantially coaxial with the first flexible member exterior wall 48. A second rigid sleeve 66 is also connected to the second flexible member 60.

The second rigid sleeve 66 is substantially cylindrical and has an aperture therein defining a second rigid sleeve interior wall 68, with a radius substantially equal to the radius of the second flexible member interior wall 62. The exterior of the second rigid sleeve 66 defines a second rigid sleeve exterior wall 70, which has a radius less than the radius of the second flexible member exterior wall 64 but greater than that of the second flexible member interior wall 62. The second rigid sleeve interior wall 68 and the second rigid sleeve exterior wall 70 are substantially coaxial with the first flexible member exterior wall 48. The second rigid sleeve 66 has a first end 72 and a second end 74, and the first end 72 is connected to the second flexible member 60.

A third flexible member 76 is connected to the second end 74 of the second rigid sleeve 66. The third flexible member 76 is substantially annular and has an aperture therein defining a third flexible member interior wall 78, with a radius substantially equal to the radii to the second rigid sleeve interior wall 68 and the second flexible member interior wall 62. The exterior edge of the third flexible member 76 defines a third flexible member exterior wall 80 which has a radius less than the radii of the first flexible member exterior wall 48 and the second flexible member exterior wall 64. The third flexible member interior wall 78 and the third flexible member exterior wall 80 are substantially coaxial with the first flexible member exterior wall 48. The third flexible member 76 is connected to the second end 74 of the second rigid sleeve 66.

A third rigid sleeve 82 is also connected to the third flexible member 76. The third rigid sleeve 82 is substantially cylindrical having an aperture therein defining a third rigid sleeve interior wall 84 with a radius greater than the third flexible member interior wall 78. The exterior of the third rigid sleeve 82 defines a third rigid sleeve exterior wall 86, with a radius substantially equal to the radius of the third flexible member exterior wall 80. The third rigid sleeve interior wall 84 and the third rigid sleeve exterior wall 86 are coaxial with the first flexible member exterior wall 48. The third rigid sleeve 82 has a first end 88 and a second end 90. The first end 88 of the third rigid sleeve 82 is connected to the third flexible member 76. A plurality of spokes 92 project radially from the third rigid sleeve 82 which connect to the damper housing 36.

A fourth flexible member 94 is also connected to the third rigid member 82. The fourth flexible member 94 is substantially annular and is essentially identical to the third flexible member 76. The fourth flexible member 94 is connected to the second end 90 of the third rigid sleeve 82.

A fourth rigid sleeve 96 is also attached to the fourth flexible member 94. The fourth rigid sleeve 96 is substantially cylindrical and is essentially identical to the second rigid sleeve 66. The fourth rigid sleeve 96 has a first end 98 that is connected to the fourth flexible member 94.

A fifth flexible member 100 is also connected to the fourth rigid sleeve 96. The fifth flexible member 100 is annular and is essentially identical to the second flexible member 60. The fifth flexible member 100 is connected to a second end 102 of the fourth rigid sleeve 96.

A fifth rigid sleeve 104 is also connected to the fifth flexible member 100. The fifth rigid sleeve 104 is substantially cylindrical and is essentially identical to the first rigid sleeve 50. The fifth rigid sleeve 104 has a first end 106 that is connected to the fifth flexible member 100.

A sixth flexible member 108 is also connected to the fifth rigid sleeve 104. The sixth flexible member 108 is substantially annular and is essentially identical to the first flexible member 44. The sixth flexible member 108 is connected to a second end 110 of the fifth rigid sleeve 104, and a sixth flexible member interior wall 112 is connected to the shaft 42.

The structure above described permits increased axial deflection while maintaining relatively rigid radial stiffness. The axial deflection of the embodiment just described is approximately three times the axial deflection of the first diaphragm 32 and second diaphragm 34 depicted in FIG. 3, assuming the flexible members described and the diaphragms have similar dimensions. This result is achieved because the first set of three flexible members acts in series and the second set of three flexible members acts in series. The two sets act in parallel. In other words, the deflection within each set of flexible members is cumulative. That is, the first flexible member 44 will deflect and the deflection of the second flexible member 60 will be added to that deflection, as will the deflection of the third flexible member 76. This permits the third rigid sleeve 82 to move, relative to the shaft 42, the aggregate of the individual deflection of the first, second and third flexible members. Translation of the third rigid member relative to the shaft 42 necessarily requires the fourth, fifth and sixth flexible members to deflect the same distance as the first, second and third flexible members, but this deflection is not cumulative. Thus, it will be appreciated that the fourth, fifth and sixth members may be eliminated if less radial rigidity is required.

The axial deflection of the above described structure is less than the deflection of the typical welded bellows as known in the art. However, welded bellows may distort upon application of radial force. This distortion reduces the welded bellows' ability to resist radial deflection. In contrast, the rigid sleeves described above maintain the parallel alignment of the flexible members. Maintaining the flexible members in parallel alignment substantially increases the structure's ability to resist distortion. The undistorted flexible members resist radial deflection better than welded bellows.

The resistance to radial deflection can be further enhanced by adding optional stiffening members, as illustrated in FIG. 6. These stiffening members also reduce or cancel torsional forces and thus distortion. Specifically, a radial load induces equal and opposite moments in the first rigid sleeve 50 and fifth rigid sleeve 104. Equal and opposite moments are also created in the second rigid sleeve 66 and fourth rigid sleeve 96. As illustrated, a first stiffener 114 joins the first rigid sleeve 50 to the fifth rigid sleeve 104 and thereby cancels the moments induced in the first rigid sleeve 50 and the fifth rigid sleeve 104. A second stiffening member 116 is connected to the second rigid sleeve 66 and the fourth rigid sleeve 96 which likewise cancels the moments induced in the second rigid sleeve 66 and the fourth rigid sleeve 96.

The first stiffening member 114 can be cylindrical with apertures therein to permit the spokes 92 to pass from the third rigid sleeve 82 and to connect to the damper housing 36. The first stiffening member 114 can also be a series of rods or spokes connecting the first rigid sleeve 50 to the fifth rigid sleeve 104. All that is required is that the first stiffening member 114 be sufficiently rigid to cancel the moments induced in the first rigid sleeve 50 and the fifth rigid sleeve 104. The second stiffening member 116 can likewise be cylindrical or a series of rods. Again, all that is needed is a member of sufficient rigidity to cancel the moments induced in the second rigid sleeve 66 and the fourth rigid sleeve 96 upon application of a radial force to the structure.

The first stiffening member 114 and the second stiffening member 116 do not carry axial forces from one rigid sleeve to another. Upon application of an axial force to the shaft 42 in one direction and an opposing force to the connecting housing which is then transferred through the spokes 92 to the third rigid sleeve 82, the shaft 42 will move relative to the third rigid sleeve 82. As the shaft 42 moves axially, the first rigid sleeve 50 and the fifth rigid sleeve 104 will deflect an equal amount, in the same direction. Similarly, the second rigid sleeve 66 and the fourth rigid sleeve 96 will deflect equivalently.

In the embodiment just described, the first diaphragm 32 and second diaphragm 34 of FIG. 3 were replaced on a conventional viscous fluid damper by an embodiment of the present invention attached at either end of the viscous fluid damper. It will be recognized by those of ordinary skill in the art that the axial deflection of the described structure can be increased merely by the addition of rigid sleeves and flexible members. Those of ordinary skill in the art will also recognize that the invention described can form the body of a viscous damper with the piston and rod assembly disposed between the first flexible member 44 and the sixth flexible member 108.

In another embodiment, it is anticipated that the flexible members and rigid sleeves may be used to replace the first bellows 38 and the second bellows 40 depicted in FIG. 4. In such an embodiment the first flexible member 44 is connected to the first hub 28. A first rigid sleeve 50 would then be attached to the first flexible member 44 as described above, followed by a second flexible member 60 connected to the first rigid sleeve 50, and a second rigid sleeve 66 connected to the second flexible member 60, and a third flexible member 76 connected to the second rigid sleeve 66. The third flexible member 76 would then be connected to the damper housing 36. A similar compound bellows structure would replace the second bellows 40. Those of ordinary skill in the art will recognize that this compound bellows can be extended merely by adding additional rigid sleeves and flexible members.

Those of ordinary skill in the art will also recognize that the inventions described are not limited in their application to viscous fluid dampers. The structure described can be used in any application where deflection in a first plane is to be maximized while controlling deflection in a second perpendicular plane.

It is contemplated in the embodiments discussed that the flexible members will be made from titanium of a thickness from 0.001" to 0.01". Nickel or stainless steel can also be used. It is also contemplated that the rigid sleeves, shaft and stiffening members will also be made of titanium.

The foregoing description is directed to particular embodiments of the invention for the purposes of illustration and explanation. It will be apparent, however, to one of ordinary skill in the art that many modifications and changes to the embodiments set forth above are possible without departing from the scope and spirit of the invention. It is intended that the following claims be interpreted to embrace all such modifications and changes.

What is claimed is:

1. An assembly for controlling axial movement of an axially moveable member with respect to a fixed radial member, comprising:
   a first generally annular shaped flexible member attached along a radially innermost peripheral portion thereof to said axially moveable member in a manner generally perpendicular to the axis of movement of said movable member;
   a first generally cylindrical rigid member concentrically surrounding said axially moveable member and being attached to a radially outermost peripheral portion of said first flexible member;
   a second generally annular shaped flexible member attached to said first rigid member at a radially outermost peripheral portion thereof so as to be spaced from and generally parallel to said first flexible member, and having an interior opening which permits the moveable member to move therethrough; and
   a second generally cylindrical rigid member concentrically surrounding the moveable member and being attached to a radially innermost peripheral portion of said second flexible member, said second rigid member communicating with the fixed radial member.

2. The assembly of claim 1 further comprising:
   a third generally annular shaped flexible member attached to said second rigid member at a radially innermost peripheral portion thereof so as to be spaced from and generally parallel to said second flexible member, and having an interior opening which permits the moveable member to move therethrough;
   a third generally cylindrical rigid member concentrically surrounding the movable member, and being attached to a radially outermost peripheral portion of said third flexible member, wherein said third rigid member is fixed to said fixed radial member;
   a fourth generally annular shaped flexible member attached to said third rigid member at a radially outermost peripheral portion thereof;
   a fourth generally cylindrical rigid member concentrically surrounding said moveable member and connected to a radially innermost peripheral portion of said fourth flexible member;
   a fifth generally annular shaped flexible member attached to said fourth rigid member at a radially innermost peripheral portion thereof,
   a fifth generally cylindrical rigid member concentrically surrounding said movable member and connected to a radially outermost peripheral portion of said fitch flexible member; and
   a sixth generally annular shaped flexible member connected to said fifth rigid member at a radially outermost peripheral portion thereof and to said axially movable member at a radially innermost portion thereof.

3. The assembly of claim 2, further comprising:
   a first stiffening member connected to said first rigid member and to said fifth rigid member.

4. The assembly of claim 3 further comprising:
   a second stiffening member connected to said second rigid member and to said fourth rigid member.

5. The assembly of claim 4 further comprising:
   a spoke connected to said third rigid member and said spoke passing through an aperture in said first stiffening member; and
   said spoke adapted to transfer force to said third rigid member from an external source.

6. A structure with enhanced elastic deformation characteristics comprising:
   a first force input means;
   a first flexible member, said first flexible member being substantially annular, said first flexible member having an aperture therein defining a first flexible member interior wall, the exterior edge of said first flexible member defining a first flexible member exterior wall, said first force input means being connected to said first flexible member at said first flexible member interior wall;
   a first rigid sleeve, said first rigid sleeve being substantially cylindrical, said first rigid sleeve having an aperture therein defining a first rigid sleeve interior wall, said first rigid sleeve interior wall having a radius greater than said first flexible member interior wall, the exterior of said first rigid sleeve defining a first rigid sleeve exterior wall, said first rigid sleeve exterior wall having a radius substantially equal to the radius of said first flexible member exterior wall, said first rigid sleeve interior wall and said first rigid sleeve exterior wall being substantially coaxial with said first flexible member exterior wall, said first rigid sleeve having a first end and a second end, said first end of said first rigid sleeve connected to said first flexible member;
   a second flexible member, said second flexible member being substantially annular, said second flexible member having an aperture therein defining a second flexible member interior wall, said second flexible member interior wall having a greater radius than said first flexible member interior wall but not as great as the radius of said first rigid sleeve interior wall, the exterior edge of said second flexible member defining a second flexible member exterior wall, said second flexible member exterior wall having a radius substantially equal to the radius of said first flexible member exterior wall and said first rigid sleeve exterior wall, said second flexible member interior wall and said second flexible member exterior wall being substantially coaxial with said first flexible member exterior wall, said second flexible member connected to said second end of said first rigid sleeve;

a second rigid sleeve, said second rigid sleeve being substantially cylindrical, said second rigid sleeve having an aperture therein defining a second rigid sleeve interior wall, said second rigid sleeve interior wall having a radius substantially equal to the radius of said second flexible member interior wall, the exterior of said second rigid sleeve defining a second rigid sleeve exterior wall, said second rigid sleeve exterior wall having a radius less than the radius of said second flexible member exterior wall, said second rigid sleeve interior wall and said second rigid sleeve exterior wall being substantially coaxial with said first flexible member exterior wall, said second rigid sleeve having a first end and a second end, said first end of said second rigid sleeve connected to said second flexible member;

a third flexible member, said third flexible member being substantially annular, said third flexible member having an aperture therein defining a third flexible member interior wall, said third flexible member interior wall having a radius substantially equal to the radius of said second rigid sleeve interior wall, the exterior edge of said third flexible member defining a third flexible member exterior wall, said third flexible member interior wall and said third flexible member exterior wall being substantially coaxial with said first flexible member exterior wall, said third flexible member connected to said second end of said second rigid sleeve; and said third flexible member being attached to a third rigid member.

7. The structure of claim 6, wherein said third rigid member is:

a third rigid sleeve, said third rigid sleeve being substantially cylindrical and having an aperture therein defining a third rigid sleeve interior wall, said third rigid sleeve interior wall having a radius greater than said third flexible member interior wall, the exterior of said third rigid sleeve defining a third rigid sleeve exterior wall, said third rigid sleeve exterior wall having a radius substantially equal to the radius of said third flexible member exterior wall, said third rigid sleeve interior wall and said third rigid sleeve exterior wall being coaxial with said first flexible member exterior wall, said third rigid sleeve having a first end and a second end, said first end of said third rigid sleeve connected to said third flexible member;

a fourth flexible member, said fourth flexible member being substantially annular, said fourth flexible member having an aperture therein defining a fourth flexible member interior wall, said fourth flexible member interior wall having a radius substantially equal to the radius of said third flexible member interior wall, the exterior edge of said fourth flexible member defining a fourth flexible member exterior wall, said fourth flexible member exterior wall having a radius substantially equal to the radius of said third flexible member exterior wall, said fourth flexible member interior wall and said fourth flexible member exterior wall being coaxial with said first flexible member exterior wall, said fourth flexible member connected to said second end of said third rigid sleeve;

a fourth rigid sleeve, said fourth rigid sleeve being substantially cylindrical, said fourth rigid sleeve having an aperture therein defining a fourth rigid sleeve interior wall, said fourth rigid sleeve interior wall having a radius substantially equal to the radius of said fourth flexible member interior wall, the exterior of said fourth rigid sleeve defining a fourth rigid sleeve exterior wall, said fourth rigid sleeve exterior wall having a radius less than the radius of said fourth flexible member exterior wall, said fourth rigid sleeve interior wall and said fourth rigid sleeve exterior wall being coaxial with said first flexible member exterior wall, said fourth rigid sleeve having a first end and a second end, said first end of said fourth rigid sleeve connected to said fourth flexible member;

a fifth flexible member, said fifth flexible member being substantially annular, said fifth flexible member having an aperture therein defining a fifth flexible member interior wall, said fifth flexible member interior wall having a radius substantially equal to the radius of said fourth rigid sleeve interior wall, the exterior edge of said fifth flexible member defining a fifth flexible member exterior wall, said fifth flexible member exterior wall having a radius substantially equal to the radius of said first flexible member exterior wall, said fifth flexible member interior wall and said fifth flexible member exterior wall being substantially coaxial with said first flexible member exterior wall, said fifth flexible member connected to said second end of said fourth rigid sleeve;

a fifth rigid sleeve, said fifth rigid sleeve being substantially cylindrical, said fifth rigid sleeve having an aperture therein defining a fifth rigid sleeve interior wall, said fifth rigid sleeve interior wall having a radius greater than the radius of said fifth flexible member interior wall, the exterior of said fifth rigid sleeve defining a fifth rigid sleeve exterior wall, said fifth rigid sleeve exterior wall having a radius substantially equal to the radius of said fifth flexible member exterior wall, said fifth rigid sleeve interior wall and said fifth rigid sleeve exterior wall being substantially coaxial with said first flexible member exterior wall, said fifth rigid sleeve having a first end and a second end, said first end of said fifth rigid sleeve connected to said fifth flexible member; and a sixth flexible member, said sixth flexible member being substantially annular, said sixth flexible member having an aperture therein defining a sixth flexible member interior wall, the exterior edge of said sixth flexible member defining a sixth flexible member exterior wall, said sixth flexible member exterior wall having a radius substantially equal to the radius of said fifth rigid sleeve exterior wall, said sixth flexible member exterior wall being substantially coaxial with said first flexible member exterior wall, said first force input means being connected to said first flexible member at said sixth flexible member interior wall.

8. The structure of claim 7 wherein the third rigid sleeve is connected to a second force input means.

9. The structure of claim 7 wherein:
the structure acts as a hermetic seal.

10. The structure of claim 7 wherein the radius of said third flexible member exterior wall and said fourth flexible member exterior wall and said third rigid sleeve exterior wall are less than the radius of said first rigid sleeve exterior wall and said fifth rigid sleeve exterior wall.

11. The structure of claim 10 further comprising:
a first stiffening member, said first stiffening member connected to said first rigid sleeve exterior wall and to said fifth rigid sleeve exterior wall; and
a second stiffening member, said second stiffening member connected to said second rigid sleeve interior wall and to said fourth rigid sleeve interior wall.

12. The structure of claim 11 wherein:
said third rigid sleeve is connected to a second force input means;
said first stiffening member is substantially cylindrical and a plurality of apertures are found therein with said second force input means projecting therethrough;
said second stiffening member is substantially cylindrical; and
said first stiffening member and said second stiffening member are coaxial with said first flexible member exterior wall.

13. An apparatus for controlling movement between an axially movable member and a fixed radial member, comprising:
elastic deflection means for allowing controlled axial movement between said axially movable member and said fixed radial member through deflection of a plurality of parallel, spaced flexible members each defining an interior opening therein:
radial movement prevention means for preventing relative radial movement of said flexible members, said radial movement prevention means comprising a plurality of rigid cylindrical members interposed between adjacent pairs of flexible members, wherein adjacent rigid cylindrical members are dimensionally, radially offset from one another; and
wherein said fixed radial member is attached to one of said rigid members, and wherein said movable member is attached to one of said flexible members perpendicular thereto and extends through an aperture in said fixed radial member, allowing relative axial movement therebetween.

14. The apparatus of claim 13, wherein said axially movable member extends through the aperture in said fixed radial member perpendicular thereto, is fixed to an upper flexible member and a lower flexible member, and passes through the interior openings of a plurality of said flexible members disposed between said upper flexible member and said lower flexible member so as to allow relative axial movement therebetween.

15. The apparatus of claim 14, wherein said flexible members are annular and coaxial.

16. The apparatus of claim 15, wherein said plurality of rigid members are coaxial with said flexible members.

17. The apparatus of claim 16, further comprising a stiffener connecting alternate rigid members.

18. The apparatus of claim 13, wherein said axially movable member comprises a shaft coaxial with said flexible members and said rigid members; and
said fixed radial member comprises a rigid spoke member connected to a housing.

* * * * *